United States Patent
Tomita et al.

(10) Patent No.: US 10,160,359 B2
(45) Date of Patent: Dec. 25, 2018

(54) SEATBACK PANEL

(71) Applicant: MAZDA MOTOR CORPORATION, Hiroshima (JP)

(72) Inventors: Toshihiko Tomita, Aki-gun (JP); Motoharu Sato, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/440,518

(22) Filed: Feb. 23, 2017

(65) Prior Publication Data
US 2017/0267128 A1 Sep. 21, 2017

(30) Foreign Application Priority Data
Mar. 15, 2016 (JP) .................. 2016-050931

(51) Int. Cl.
*B60N 2/64* (2006.01)
*B60N 2/68* (2006.01)
*B60N 2/20* (2006.01)

(52) U.S. Cl.
CPC ............. *B60N 2/686* (2013.01); *B60N 2/206* (2013.01); *B60N 2/643* (2013.01)

(58) Field of Classification Search
CPC ...... B60N 2/206; B60N 2/3011; B60N 2/686; B60N 2002/0216; B60N 2/64; B60N 2/643
USPC .......................... 297/452.18, 452.55, 452.57
See application file for complete search history.

(56) References Cited

U.S. PATENT DOCUMENTS

| | | | |
|---|---|---|---|
| 6,439,666 B1 | 8/2002 | Kimura et al. | |
| 2012/0098312 A1* | 4/2012 | Armbruster | B60N 2/206 297/354.1 |
| 2012/0200137 A1* | 8/2012 | Tosco | B23K 37/04 297/452.48 |
| 2017/0113575 A1* | 4/2017 | Epaud | B60N 2/07 |
| 2017/0313223 A1* | 11/2017 | Tomita | B60N 2/809 |
| 2017/0368975 A1* | 12/2017 | Miyawaki | B60N 2/682 |
| 2018/0079340 A1* | 3/2018 | Kimura | B60N 2/686 |

FOREIGN PATENT DOCUMENTS

| | | | | |
|---|---|---|---|---|
| EP | 1338466 A1 * | 8/2003 | ........... | B60N 2/3013 |
| EP | 3078542 A1 * | 10/2016 | ............ | B60N 2/682 |
| FR | 2801256 A1 * | 5/2001 | ............ | B60N 2/015 |
| JP | 2011-105049 A | 6/2011 | | |
| WO | WO-2011154957 A1 * | 12/2011 | ......... | B29C 47/0019 |
| WO | WO-2012075297 A1 * | 6/2012 | ........... | B60N 2/2893 |

* cited by examiner

Primary Examiner — Ryan D Kwiecinski
(74) Attorney, Agent, or Firm — Studebaker & Brackett PC

(57) ABSTRACT

A seatback panel forms a seatback which is configured to be selectable between a rising-up position and a falling-down position. The seatback panel is made of a metal-made plate material, and embossed portions and bead portions surrounding the embossed portions are formed in areas at its flat face. The bead portions are provided to protrude on one side of the panel and the embossed portions are provided to protrude on the other side of the panel. A protrusion height of the bead portion is configured to be different from a protrusion height of the embossed portion. Either one of the bead portion and the embossed-portion which has a smaller projection height is configured to protrude on a back-face side of the panel having the rising-up position.

14 Claims, 7 Drawing Sheets

(Rising-Up Position)

SEATBACK PANEL

BACKGROUND OF THE INVENTION

The present invention relates to a seatback panel.

There is a type of seat comprising a seat cushion and a seatback as a vehicle's (automotive vehicle's) rear seat, in particular, in which the seatback is configured to be selectable between its rising-up position and its falling-down position which the seatback has when falling down from the rising-up position. That is, the seatback serves as a support of a back of a passenger seated on the seat cushion when the seatback has the rising-up position, and the seatback having the falling-down position provides its back-face side as a placing face where baggage or the like can be placed.

It is general that a frame portion of the seatback is composed of a frame and a seatback panel, and the frame is provided at least along a peripheral edge portion of the seatback panel. Since the seatback panel having the rising-up position receives a load from the passenger positioned behind, and when having the falling-down position, the seatback receives another load from the baggage or the like placed of the seatback panel, the sufficient rigidity is required for the seatback.

While the seatback panel having a considerably-large area is made of a metal-made plate material in order to secure the rigidity, a simple flat-shaped panel may lack of the rigidity. Japanese Patent Laid-Open Publication No. 2011-105049 discloses a structure in which many V-shaped bead portions are provided adjacently to each other in a vertical direction in order to improve the rigidity of the seatback panel.

Herein, the weight reduction of the vehicle has been recently desired strongly, so making the thickness of the seatback panel properly thin has been tried. However, it is difficult to ensure the sufficient rigidity by simply making unevenness, such as the bead portion, on the seatback panel in a case where the thickness of the seatback panel is made thin. Accordingly, any other countermeasures have been desired.

In particular, if the rigidity of the seatback panel is insufficient, the seatback panel resiliently deforms easily in its thickness direction. Specifically, when receiving the load from the passenger, the seatback panel having the rising-up position resiliently deforms largely toward its back-face side. Accordingly, the seatback panel resiliently deforms back toward its front-face side as soon as the load from the passenger is released (cancelled). Inversely, in a case where the baggage or the like are placed on the back face of the seatback panel having the falling-down position, the seatback panel resiliently deforms largely toward its front-face side, and the seatback panel resiliently deforms back toward its back-face side as soon as the baggage or the like are removed. Additionally, when the seatback's position is changed between the rising-up position and the falling-down position, there occurs some noise which may be caused by the bending deformation of the seatback panel.

SUMMARY OF THE INVENTION

The present invention has been devised in view of the above-described matters, and an object of the present invention is to provide a seatback panel which has the thin thickness and the sufficient rigidity which can be balanced at a high level.

The present invention is a seatback panel forming a seatback which is configured to be selectable between a rising-up position and a falling-down position which the seatback has when falling down from the rising-up position, wherein the seatback panel is made of a metal-made plate material which includes an embossed portion and a bead portion surrounding the embossed portion which are formed at a flat face of thereof, the bead portion is provided to protrude on one side of the plate material and the embossed portion is provided to protrude on the other side of the plate material, a protrusion height of the bead portion is configured to be different from that of the embossed portion, and either one of the bead portion and the embossed portion which has a smaller projection height is configured to protrude on a back-face side of the seatback having the rising-up position.

According to the present invention, since the embossed portion and the bead portion surrounding the embossed portion are formed at the flat face, the rigidity of the flat face can be greatly improved. In particular, since the embossed portion and the bead portion are configured to protrude in the opposite directions to each other, the rigidity can be improved more than a case where these are configured to protrude in the same direction. Further, since either one of these two portions which has the smaller projection height is configured to protrude on the back-face side of the seatback panel, there may occur no problem even when the baggage is placed on the back-face side of the seatback panel of the seatback having the falling-down position.

In an embodiment of the present invention, the protrusion height of the embossed portion is larger than that of the bead portion. This embodiment is preferable in easily forming the narrow bead portion or the like.

In another embodiment of the present invention, the bead portion is provided in a closed ring shape to continuously extend in a circumferential direction of the embossed portion. According to this embodiment, the rigidity of the seatback panel can be further improved.

In another embodiment of the present invention, the bead portion is provided in a rectangular ring shape. This embodiment is preferable in resisting against external force acting from a wide direction.

In another embodiment of the present invention, the bead portion is provided in a circular ring shape. This embodiment is preferable in resisting against the external force acting from the wide direction.

In another embodiment of the present invention, the embossed portion is configured to be circular. This embodiment is preferable in resisting against the external force acting from the wide direction.

In another embodiment of the present invention, the embossed portion is configured to be rectangular. This embodiment is preferable in resisting against the external force acting from the wide direction.

In another embodiment of the present invention, the bead portion comprises a pair of right-and-left long portions which extend in a specified direction and plural short portions which extend in a direction crossing the specified direction and connect the pair of right-and-left long portions, and the embossed portion is provided in each area which is portioned by the long portions and the short portions of the bead portion. According to this embodiment, the rigidity can be improved greatly by providing the plural embossed portions to be distributed in the specified direction and making the bead portions continuous to each other.

In another embodiment of the present invention, the bead portion comprises a closed ring-shaped long portion extending in a circumferential direction and short portions which are provided inside the ring-shaped long portion to be continuous to the ring-shaped long portion so as to partition an inside portion enclosed by the ring-shaped long portion into plural areas, and the embossed portion is provided at each of the plural areas. According to this embodiment, the rigidity can be improved greatly.

In another embodiment of the present invention, the metal-made plate material is a steel plate having a thickness of 0.2-0.5 mm. This embodiment is preferable in ensuring the rigidity and achieving the weight reduction sufficiently.

Other features, aspects, and advantages of the present invention will become apparent from the following description which refers to the accompanying drawings.

DETAILED DESCRIPTION OF THE INVENTION

Figure 1:
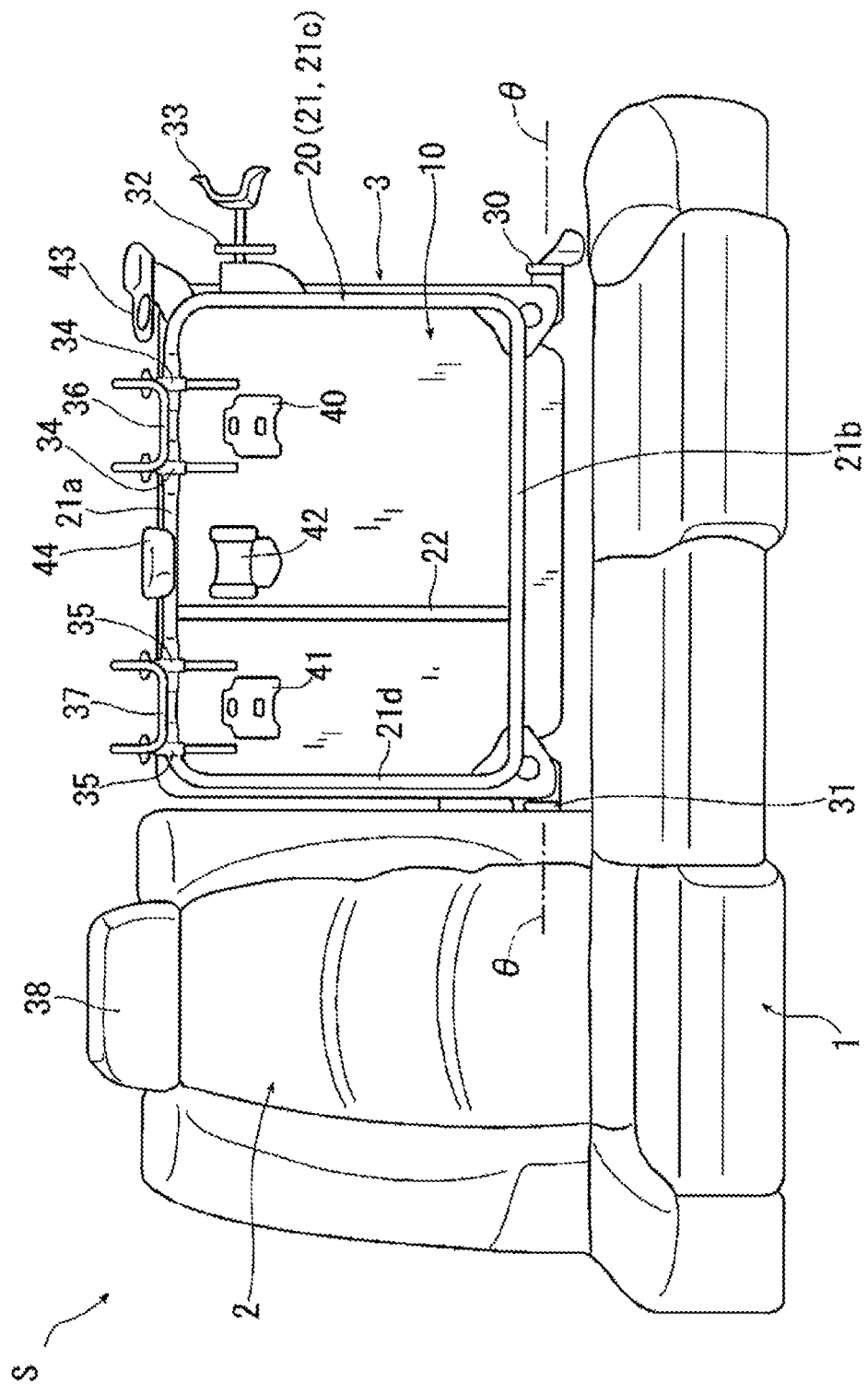
FIG. 1 is a front view showing an embodiment of a rear seat to which the present invention is applied.

FIG. 1 shows a rear seat S of a vehicle. Herein, reference character 1 denotes a seat cushion, and reference characters 2, 3 denote laterally-split seatbacks. The seatback 2 is provided for a single passenger and the seatback 3 is provided for two passengers. The seatback 3 is illustrated in a state where a cushion material and the like are removed.

The seatback 3 comprises a seatback panel 10 and a frame 20. The seatback panel 10 is made of a metal-made plate material (a normal steel plate in the embodiment), and FIG. 1 shows the rear seat S in a simple state where a bead portion, an embossed portion, which will be described later, and others are omitted.

The frame 20 includes a rectangular main frame 21 which is provided along an outer peripheral edge portion of the seatback panel 10. That is, the main frame 21 comprises an upper portion 21a which extends in a vehicle width direction along an upper edge portion of the seatback panel 10, a lower portion 21b which extends in the vehicle width direction along a lower edge portion of the seatback panel 10, and a pair of right-and-left vertical portions 21c, 21d which extend in a vertical direction along right-and-left side edge portions of the seatback panel 10. The frame 20 further comprises an assist frame 22 which connects the upper portion 21a and the lower portion 21b. This frame 20 is made of a metal-made pipe material (a steel-made pipe material in the embodiment), and fixed to the seatback panel 10 by welding or the like at its four corners, for example.

The seatback 3 is connected to the seat cushion 1 via brackets 30, 31 which are provided at both end portions, in the vehicle width direction, of the main frame 21 such that the seatback 3 is swingable (rotatable) in a longitudinal direction around a swing (rotational) axis θ extending in the vehicle width direction. In FIG. 1, the seatback 3 is illustrated in a state where it has a rising-up position, and in this rising-up position, a lock member 32 which is provided at an upper left end portion of the main frame 21 is configured to engage with an engaging member 33 which is provided on a vehicle-body side, thereby holding the rising-up position of the seatback 3.

The seatback 3 has a falling-down position other than the rising-up position shown in FIG. 1. That is, by swinging the seatback 3 forward by roughly 180 degrees from the rising-up position shown in FIG. 1 in a state where locking of the lock member 32 with the engaging member 33 is released, a back-face side (rear-face side) of the seatback 3 comes to face upward, so that the back-face side of the seatback 3 can serve as a placing face where baggage is placed. Two pairs of holding cylindrical portions 34, 35 are fixed to the upper portion 21a of the main frame 21 (by welding, for example). Frames for headrests 36, 37 are respectively held at the two pairs of holding cylindrical portions 34, 35 so that their positions are adjustable in the vertical direction.

The seatback 2 is also configured to be selectable between a rising-up position and a falling-down position, like the seatback 3. A frame structure of the seatback 2 is composed of a seatback panel and a frame similarly to the seatback 3. A headrest for the seatback 2 is denoted by reference character 38.

The seatbacks 2, 3 are selectable between their rising-up positions and their falling-down positions in such a manner that both of these 2, 3 have the rising-up positions shown in FIG. 1 at the same time, only the seatback 2 has the rising-up position, only the seatback 3 has the falling-down position, and both of these 2, 3 have the falling-down positions at the same time.

In FIG. 1, reference characters 40, 41 respectively denote brackets for a child seat, reference character 42 denotes a seatbelt anchor, and reference characters 43, 44 denote seatbelt guides. The brackets 40, 41 and the seatbelt anchor 42 are respectively fixed to the seatback panel 10 by welding, for example. Further, the seatbelt guides 43, 44 are fixed to the upper portion 21a of the main frame 21.

Next, details of the seatback panel 10 will be described referring to FIGS. 2-7. The seatback panel 10 is formed by applying press processing to a normal steel plate having a thin thickness (thickness of 0.4 mm in the embodiment) in the embodiment. The seatback panel 10 is configured such that three areas R1-R3 illustrated with hatching in FIG. 5 which are positioned at a central portion thereof are formed as a flat face which extends in the vertical direction and has a large area.

The rigidity of the above-described three areas R1-R3 is relatively low in particular, so these are areas whose rigidity is strongly needed to be improved. The rigidity of these areas R1-R3 is improved by the bead portion and the embossed portion. Hereafter, a forming method of the embossed portion and the bead portion of each of the areas R1-R3 will be described. Herein, respective positions and directions of these portions will be described assuming a state where the seatback panel 10 has the riding-up position.

First, in each of the areas R1-R3, plural circular embossed portions 50 are provided in line in the extensional direction of the areas R1-R3 i.e., in the vertical direction, being spaced apart from each other. The embossed portion 50 is provided to protrude on a front-face side of the seatback panel 10 (on a side of the seatback panel 10 having the rising-up position which faces forward) in a state where it has plastic deformation.

The bead portion 51 is provided to surround the embossed portion 50. The bead portion 51 which surrounds the single embossed portion 50 is configured to be rectangular (square shaped, in the embodiment), and this bead portion 51 is provided to protrude on a back-face side of the seatback panel 10 (on a side of the seatback panel having the rising-up position which faces rearward) in a state where it has plastic deformation. The bead portion 51 surrounding the embossed portion 50 is formed in a ring shaped such that it is closed in its circumferential direction.

In each of the arears R1-R3, the bead portions 51 for the plural embossed portions 50 are provided to be continuous to each other. That is, a portion of the bead portion 51 which extends in the vehicle width direction is formed as a common portion for the upper-side embossed portion 50 and the lower-side embossed portion 50. In other words, in each of the areas R1-R3, a pair of right-and-left long bead portions (long portions) which extend in the vertical direction are provided, and these right-and-left long bead portions are interconnected by short bead portions (short portions) which extend in the vehicle width direction, thereby forming a ladder structure as a whole. Thereby, the embossed portion 50 is provided in the plural areas which are enclosed by the upper-and-lower and right-and-left bead portions.

Figure 7:
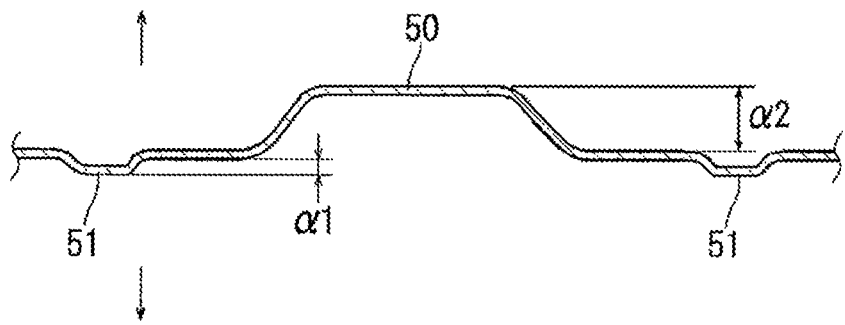
FIG. 7 is a sectional view taken along line X7-X7 of FIG. 6.

As shown in FIG. 7, the protrusion height of the bead portion 51 is denoted by reference character $\alpha 1$, and the protrusion height of the embossed portion 50 is denoted by reference character $\alpha 2$. Herein, these have magnitude relationship of $\alpha 2 > \alpha 1$. More specifically, in the embodiment, $\alpha 1$ is set to be roughly 2-3 mm and $\alpha 2$ is set to be roughly 8-10 mm.

Embossed portions 60 and bead portion 61 are provided at other portions than the areas R1-R3 as well, thereby further improving the rigidity of the seatback panel 10 as a whole. Herein, the embossed portion 60 is provided to protrude on the front-face side of the seatback panel 10, and the bead portion 61 is provided to protrude on the back-face side of the seatback panel 10. The protrusion height of the embossed portion 60 is set to be larger than that of the bead portion 61 (set to be the same as the relationship of the embossed portion 50 and the bead portion 51).

Figure 2:
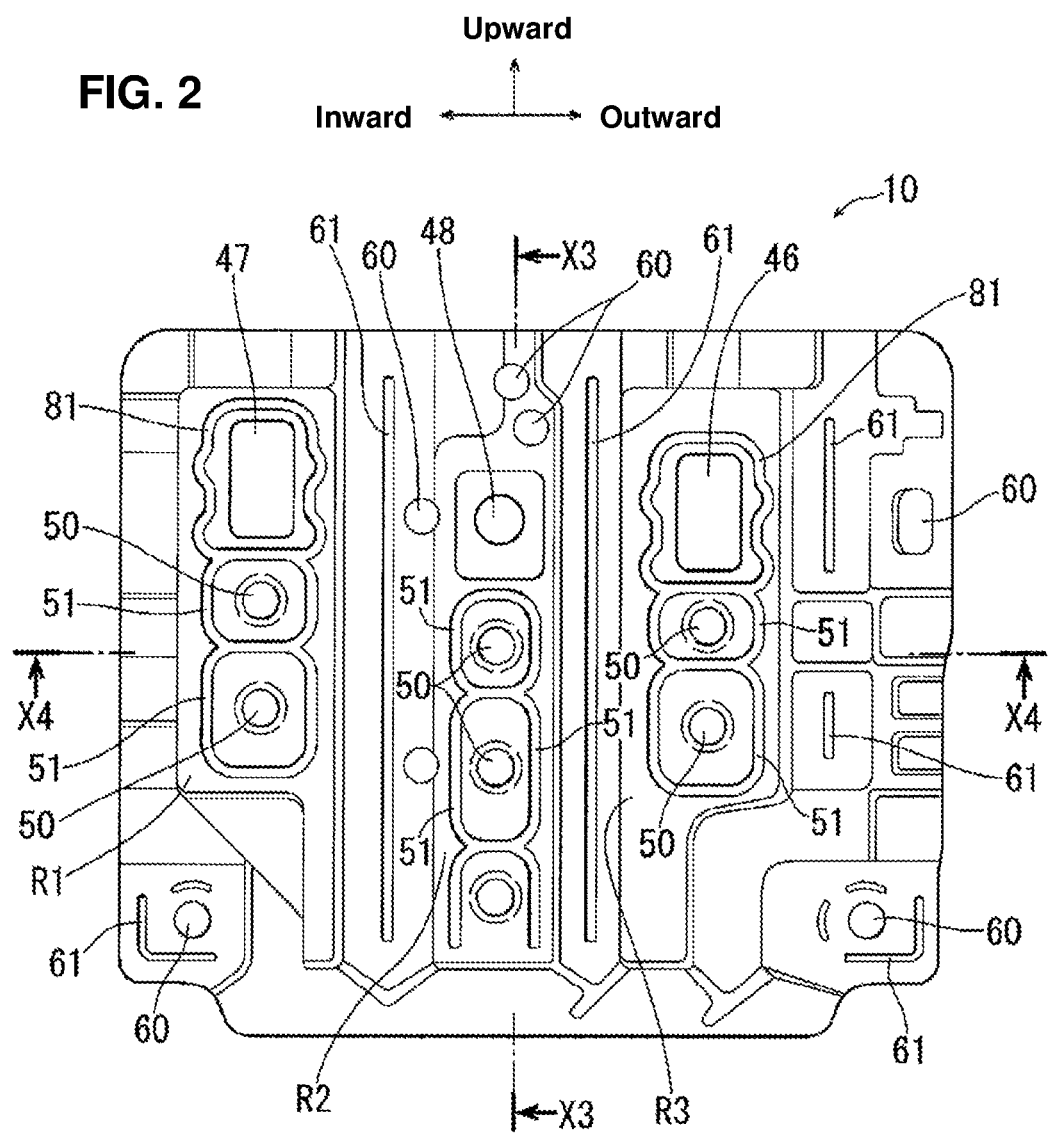
FIG. 2 is a front view of a seatback panel.
Figure 3:
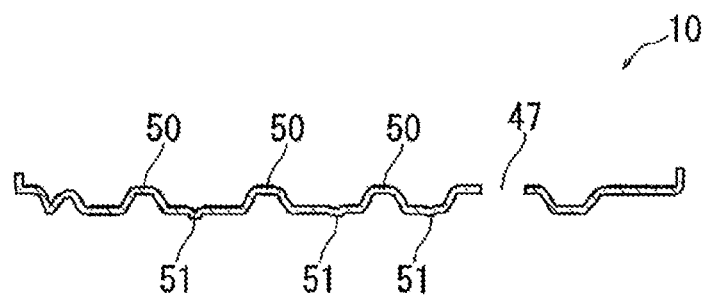
FIG. 3 is a sectional view taken along line X3-X3 of FIG. 2.
Figure 4:
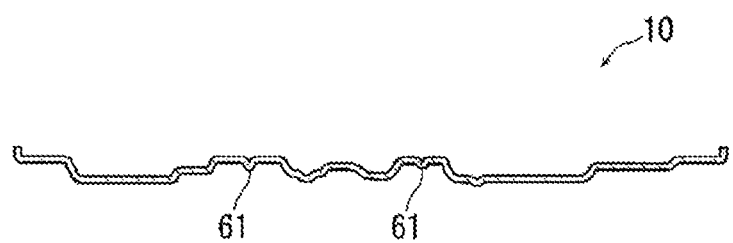
FIG. 4 is a sectional view taken along line X4-X4 of FIG. 2.
Figure 5:
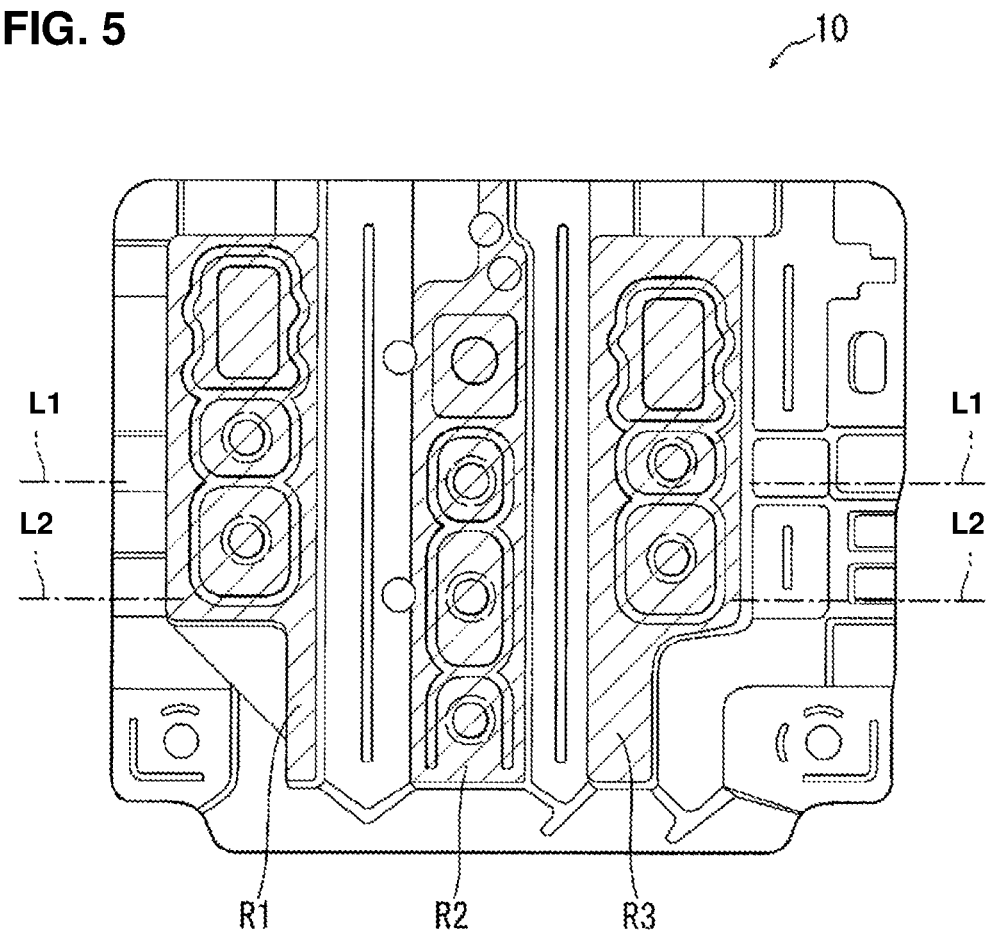
FIG. 5 is a front view of the seatback panel shown in FIG. 2, which shows a flat-face portion having a large area illustrated with hatching.
Figure 6:
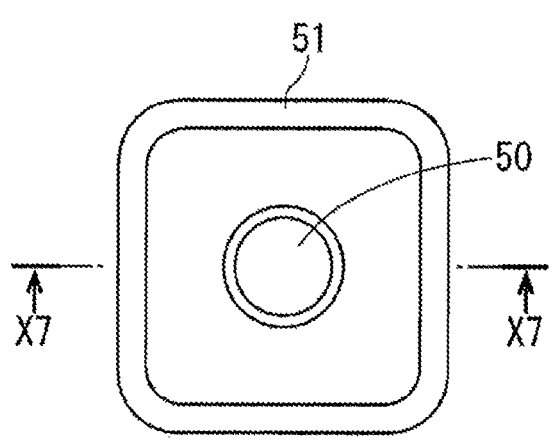
FIG. 6 is a view showing a pair of bead and embossed portions shown in FIG. 2.

In FIG. 2, reference characters 46, 47 denote attachment holes for attaching the brackets 40, 41 for child seat attachment, and reference character 48 denotes an attachment hole for attaching the seatbelt anchor 42. Of course, a thick cushion material is provided on the front-face side of the seatback panel 10, and the back-face side of the seatback panel 10 is covered with a thin coversheet so that the seatback panel 10 and the frame 20 cannot be viewed from outside.

Further, ring-shaped bead portions 81 are respectively provided to surround the attachment holes 46, 47. Each bead portion 81 is configured such that it is continuous (closed) in its circumferential direction. The bead portion 81 protrudes in the same direction as the bead portion 51. The rigidity of the vicinity of the attachment holes 46, 47 are further improved by forming of the bead portions 81. In the embodiment, a portion of the bead portion 51 forms a portion of the bead portion 81. Herein, the bead portion 51 and the bead portion 81 may be formed separately and independently from each other without commonalizing the above-described portions of those portions 51, 81. The bead portion 51 corresponds to a first bead portion and the bead portion 81 corresponds to a second bead portion.

While no bead portion which corresponds to the bead portion 81 is provided around the attachment hole for seatbelt anchor, a ring-shaped bead portion which is continuous (closed) in its circumferential direction may be provided so as to surround the attachment hole 48.

Each rectangular bead portion 51 includes two sides which extend in the vehicle width direction and face each other. The above-described two sides of the bead portions 51 which are spaced apart from each other in the vehicle width direction are positioned so as not to be positioned on the same straight line, respectively. Specifically, in FIG. 5, while the vehicle-width-direction extending side of one of the bead portions 51 exists on a straight line L1, the vehicle-width-direction extending side of the other bead portion 51 is provided not to be positioned on this straight line L1. Likewise, while the vehicle-width-direction extending side of one of the bead portions 51 exists on a straight line L2, the vehicle-width-direction extending side of the other bead portion 51 is provided not to be positioned on this straight line L2. By this configuration that the respective vehicle-width-direction extending sides of the bead portions 51 adjacently positioned in the vehicle width direction are provided not to be positioned on the same straight line, the torsional rigidity of the seatback panel 10, in particular, can be increased. Further, the respective embossed portions 50 which are provided in the areas enclosed by the beads 51 are provided not to be positioned on the same straight line in the vehicle width direction, thereby further increasing the torsional rigidity.

The seatback 2 for a single passenger shown in FIG. 1 is configured similarly to the seatback 3 for two passengers such that it is composed of the seatback panel 10 and the frame 20, and the embossed portions 50, 60 and the bead portions 51, 61, 81 are provided at its flat face having the large area.

As described above, since the seatback panel 10 is configured such that the embossed portions 50 and the bead portions 51 surrounding the embossed portions 50 are formed at the flat face having the large area, the rigidity of the flat face can be greatly improved. In particular, since the embossed portions 50 and the bead portions 51 are configured to protrude in the opposite directions to each other, the rigidity can be improved more than a case where these are configured to protrude in the same direction. Further, since the bead portion 51 is provided in the closed ring shape to continuously extend in the circumferential direction of the embossed portion 50, the rigidity can be further improved. Moreover, since the bead portions 51 for the plural embossed portions 50 are configured to be continuous to each other, the rigidity can be improved more than a case where the bead portion 51 for the specified embossed portion 50 is spaced apart from the bead portion 51 for the other embossed portion 50. Since the bead portion 51 is configured to be rectangular (square shaped, in particular), this structure is preferable in resisting against the bending force acting from various directions.

While the embossed portions 50 having the large protrusion amount are positioned on the front-face side of the seatback panel 10 when the seatback 3 (2) has the rising-up position, the large-amount protrusion of the embossed portions 50 may not cause any big problem because the cushion material covers over the front-face side of the seatback panel 10. Further, since the protrusion amount of the bead portions 51 positioned at the back-face side, i.e., the baggage placing-face side of the seatback panel 10 when the seatback 3 (2) has the falling-down position is relatively small, there may occur no problem in placing the baggage.

According to the embodiment, the desired (necessary) rigidity can be ensured by the thickness of 0.3 mm although the conventional structure may need the thickness of more than 0.5 mm. Herein, the thinner thickness may be applied depending on the shape or the number of the embossed portion 50 or the bead portion 51, the kind of material forming the seatback panel 10, or the like. For example, by applying the press processing to the normal steel plate having the thickness of 0.2-0.5 mm, the sufficient weight reduction can be achieved more than the conventional structure, ensuring the desired rigidity.

Figure 8:
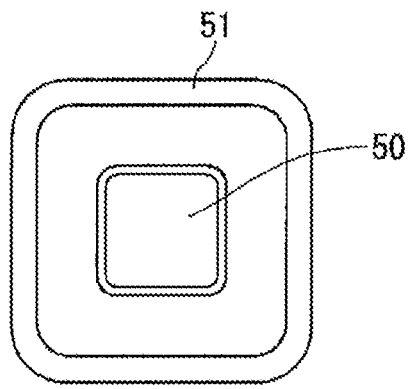
FIG. 8 is a view showing a second embodiment of the pair of bead and embossed portions.

Next, a modification of the embossed portion 50 and the bead portion 51 will be described referring to FIG. 8. The embodiment of FIG. 8 shows an example in which the embossed portion 50 is configured to be rectangular (roughly-square shaped). Herein, respective sides of the embossed portion 50 extend in parallel to the sides of the bead portion 51.

Figure 9:
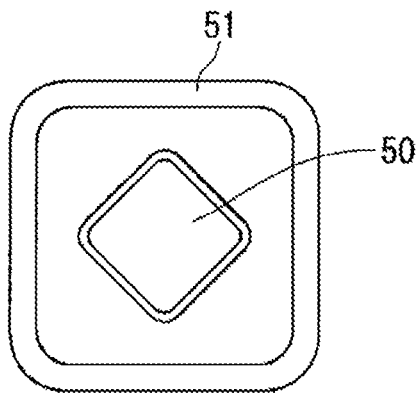
FIG. 9 is a view showing a third embodiment of the pair of bead and embossed portions.

An embodiment of FIG. 9 is configured, similarly to the embodiment of FIG. 8, such that the embossed portion 50 is rectangular (roughly-square shaped). However, the sides of the embossed portion 50 are configured to slant relative to the sides of the bead portion 51, having a slant angle of about 45 degrees. This embodiment of FIG. 9 is preferable in resisting against the bending force acting from the various directions.

Figure 10:
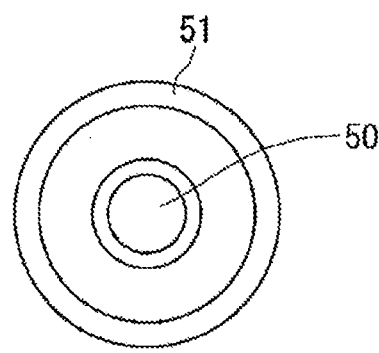
FIG. 10 is a view showing a fourth embodiment of the pair of bead and embossed portions.

The embodiment of FIG. 10 shows an example in which both the embossed portion 50 and the bead portion 51 are configured to be circular. This embodiment is also preferable in resisting against the bending force acting from the various directions. As a modification of the embodiment of FIG. 10, only the embossed portion 50 may be changed to a rectangular shape (the roughly-square shape, in particular).

Figure 11:
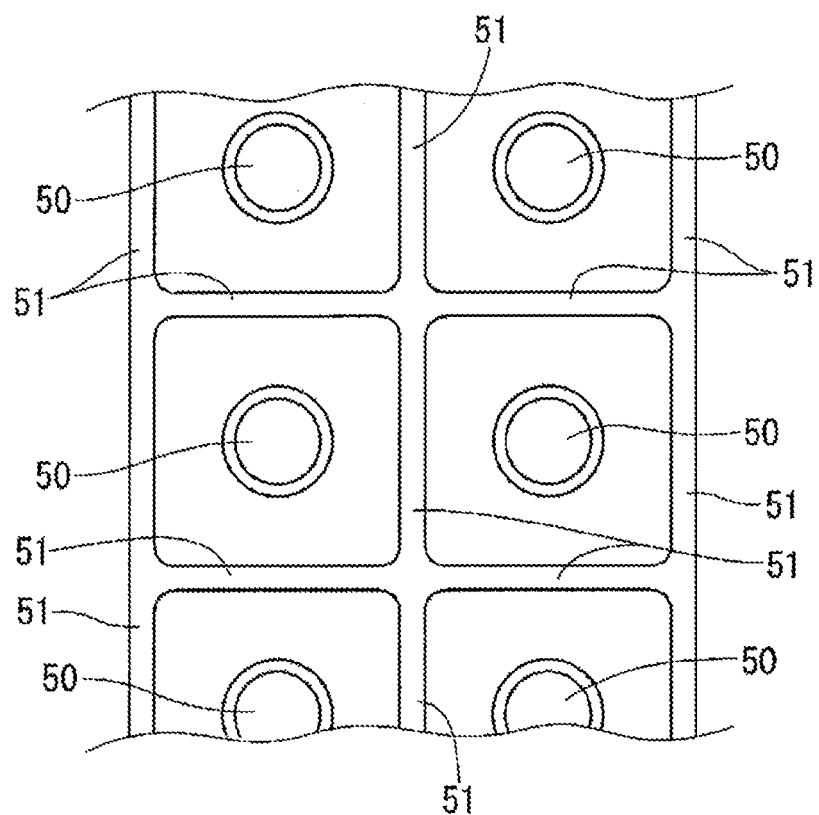
FIG. 11 is a view showing an arrangement embodiment of plural pairs of bead and embossed portions.

FIG. 11 shows another embodiment in which a pair of right-and-left groups comprising the embossed portions 50 and the bead portions 51 are arranged in line in the vertical direction, wherein the bead portions 51 are configured to be commonalized for the right-and-left embossed portions 50.

Figure 12:
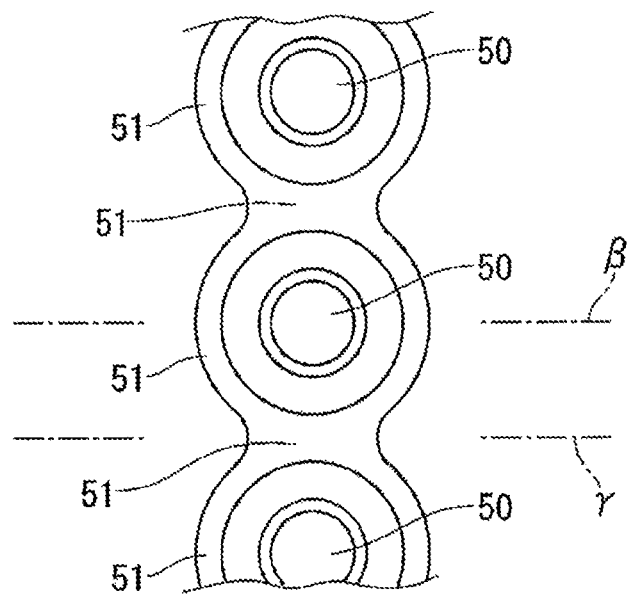
FIG. 12 is a view showing another shape-and-arrangement embodiment of the plural pairs of bead and embossed portions.

FIG. 12 shows another embodiment in which each cell comprises the embossed portion 50 and the bead portion 51 which are shown in FIG. 10 and plural cells are arranged in line. In this embodiment as well as the embodiment shown in FIG. 2, the bead portion 51 for the vertically-adjacent embossed portions 50 is commonalized, so that the bead portions 51 for the plural embossed portions 50 are configured to be continuous to each other as a whole. Herein, there may be provided plural right-and-left lines of the embossed portions 50 and the bead portions 51 shown in FIG. 12. In this case, the bead portion 51 located at the border of the right-and-left lines may be commonalized as shown in FIG. 11. Herein, the embossed portions 50 which are arranged laterally adjacent to each other may be positioned at the same level in the vertical direction (the right-and-left embossed portions 50 are positioned on a line β in FIG. 12), or shifted by a half pitch (the right-and-left embossed portions 50 are positioned on a line γ in FIG. 12).

Figure 13:
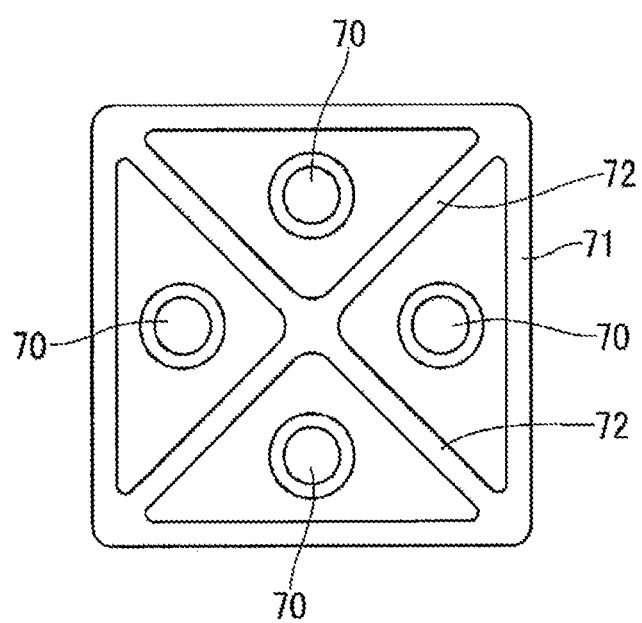
FIG. 13 is a view showing further another shape-and-arrangement embodiment of the plural pairs of bead and embossed portions.

FIG. 13 shows another embodiment in which there are provided a rectangular (roughly-square shaped) bead portion 71 (a long portion) and a pair of bead portions 72 (short portions) which extend obliquely, diagonally interconnecting corners of the bead portion 71. An embossed portion 70 is provided in each of four areas which are formed by partitioning of the bead portions 71, 72.

While the some embodiments have been described, the present invention should not be limited to the above-described embodiments, and any other modifications or improvements may be applied within the scope of a spirit of the present invention. The bead portion 51 surrounding the embossed portion 50 may be configured to be intermittent in the circumferential direction. The protrusion height of the bead portion 51 may be larger than that of the embossed portion 50. In this case, the bead portion 51 having the larger protrusion height may be provided on the front-face side of the seatback panel 10 (the face of the seatback panel having the rising-up position which faces forward), and the embossed portion 50 having the smaller protrusion height may be positioned on the back-face side of the seatback panel 10 (the face of the seatback panel having the falling-down position which faces upward). In the case where the singe embossed portion 50 and the bead portion 51 surrounding the embossed portion 50 are configured as a single cell, the adjacent cells (the bead portions 51) may be spaced apart from each other, without being continuous to each other.

The cell comprising the single embossed portion 50 and the bead portion 51 surrounding the embossed portion 50 tends to have a higher rigidity in a case where it has a smaller area (this is an area enclosed by the bead portion 51). Therefore, it is preferable that the area of the cell be set at 100-500 cm$^2$, for example, and also it is preferable that the area of the embossed portion 50 be set at about 10-30% of the area enclosed by the bead portion 51. The cells can be properly provided at the flat-face portion of the seatback panel 10 which requires the rigidity. For example, the plural cells can be provided to be distributed properly or to be adjacent to each other, or in a case where the plural cells are provided adjacently, the extensional direction of arrangement of the plural cells (the arrangement direction of the embossed portions 50) can be set at the vehicle width direction, an oblique direction, or the like. Of course, the object of the present invention should not be limited to providing the explicitly-described seatback panel, but should implicitly include providing any seatback panel which has been explained as preference or merit.

What is claimed is:

1. A seatback panel forming a seatback which is configured to be selectable between a seated position and a folded-down position which the seatback has when folded from the seated position, wherein the seatback panel includes at least one embossed portion and a bead portion surrounding the at least one embossed portion which are formed at a flat face thereof, the flat face being of a single plane, a portion of the flat face remains between the bead portion and the at least one embossed portion, the bead portion protrudes from one surface of the seatback panel and the at least one embossed portion protrudes from the other surface of the seatback panel, such that protruding directions of the bead portion and the at least one embossed portion are opposite to each other, a protrusion height of the bead portion differs from that of the at least one embossed portion, and either one of the bead portion and the at least one embossed portion, based on which has a smaller protrusion height, protrudes from a rear is configured to of the seatback panel having the seated position.

2. The seatback panel of claim 1, wherein the protrusion height of said at least one embossed portion is larger than that of said bead portion.

3. The seatback panel of claim 1, wherein said bead portion is provided in a closed ring shape to continuously extend in a circumferential direction of said at least one embossed portion.

4. The seatback panel of claim 3, wherein said bead portion is provided in a rectangular ring shape.

5. The seatback panel of claim 3, wherein said bead portion is provided in a circular ring shape.

6. The seatback panel of claim 1, wherein said at least one embossed portion has a circular shape.

7. The seatback panel of claim 1, wherein said at least one embossed portion has a rectangular shape.

8. The seatback panel of claim 1, wherein said bead portion comprises a pair of right-and-left long portions which extend in a specified direction and plural short portions which extend in a direction crossing the specified direction and connect said pair of right-and-left long portions, and said at least one embossed portion is provided in each area which is portioned by said long portions and said short portions of the bead portion.

9. The seatback panel of claim 1, wherein said bead portion comprises a closed ring-shaped long portion extending in a circumferential direction and short portions which are provided inside the ring-shaped long portion to be continuous to the ring-shaped long portion so as to partition an inside portion enclosed by the ring-shaped long portion into plural areas, and said at least one embossed portion is provided at each of said plural areas.

10. The seatback panel of claim 1, wherein a material of said seatback panel is a steel plate having a thickness of 0.2-0.5 mm.

11. The seatback panel of claim 1, wherein said seatback panel is made of a metal plate material.

12. A seatback panel forming a seatback which is configured to be selectable between a seated position and a folded-down position which the seatback has when folded from the seated position, wherein the seatback panel includes an embossed portion and a bead portion surrounding the embossed portion which are formed at a flat face thereof, the flat face being of a single plane, the bead portion protrudes from one surface of the seatback panel and the embossed portion protrudes from the other surface of the seatback panel, a protrusion height of the bead portion is smaller than that of the embossed portion, and the bead portion protrudes from a rear of the seatback panel having the seated position, and the bead portion is provided in a closed rectangular ring shape to continuously extend in a circumferential direction of the embossed portion, and the embossed portion has a circular shape.

13. The seatback panel of claim 12, wherein said seatback panel is made of a metal plate material.

14. A seatback panel forming a seatback which is configured to be selectable between a seated position and a folded-down position which the seatback has when folded from the seated position, wherein the seatback panel is made of a metal plate which includes at least one embossed portion and a bead portion surrounding the at least one embossed portion, which are formed at a flat face thereof, the flat face being of a single plane, the bead portion protrudes on one side of the plate and the at least one embossed portion protrudes on the other side of the plate, a protrusion height of the bead portion differs from that of the at least one embossed portion, either one of the bead portion and the at least one embossed portion, based on which has a smaller protrusion height, protrudes from a rear surface of the seatback panel having the seated position, and the bead portion comprises a pair of right-and-left long portions which extend in a specified direction and plural short portions which extend in a direction crossing the specified direction and connect the pair of right-and-left long portions, and the at least one embossed portion is provided in each area which is portioned by the long portions and the short portions of the bead portion.

* * * * *